(12) United States Patent
Brown et al.

(10) Patent No.: US 6,390,345 B1
(45) Date of Patent: May 21, 2002

(54) MULTI-PURPOSE TRAVEL BAG WITH A MULTI-PURPOSE STRAP

(75) Inventors: Bryan M. Brown, Buffalo; John S. Canna, Orchard Park, both of NY (US); Jeanette Numbers, San Francisco, CA (US); Mark H. Weppner, Williamsville, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/571,167

(22) Filed: May 16, 2000

(51) Int. Cl.[7] ............................................... A45C 15/00
(52) U.S. Cl. ....................... 224/578; 190/110; 224/155; 224/159; 224/678; 224/679; 297/188.09; 297/188.1; 297/485
(58) Field of Search ................................. 224/578, 155, 224/678, 679, 159; 297/17, 188.09, 188.1, 485; 190/110

(56) References Cited

U.S. PATENT DOCUMENTS

| | | |
|---|---|---|
| 1,967,533 A | 7/1934 | Koop |
| 2,544,896 A | 3/1951 | Nidetch et al. |
| 3,298,737 A | 1/1967 | Rosenfeld et al. |
| 4,527,830 A | 7/1985 | Meyers |
| 5,062,557 A | 11/1991 | Mahvi et al. |
| 5,230,450 A | 7/1993 | Mahvi et al. |
| 5,234,143 A | 8/1993 | Mahvi et al. |
| 5,577,652 A * | 11/1996 | Cooper ........................ 224/578 |
| 5,711,466 A * | 1/1998 | Kataoka et al. ............. 224/159 |
| 5,944,241 A * | 8/1999 | Globig et al. ................ 224/577 |
| 6,079,599 A * | 6/2000 | Nordstrom et al. ......... 224/153 |
| 6,095,613 A | 8/2000 | Ostrander et al. ........... 297/467 |
| 6,213,268 B1 * | 4/2001 | Dancyger .................... 190/110 |
| 6,220,493 B1 * | 4/2001 | Iijima et al. ................. 224/578 |
| 6,244,400 B1 * | 6/2001 | Bowers ....................... 190/110 |

FOREIGN PATENT DOCUMENTS

| | | |
|---|---|---|
| EP | 0 625 443 | 11/1994 |
| IT | 313959 | 1/1934 |

* cited by examiner

*Primary Examiner*—Stephen K. Cronin
*Assistant Examiner*—Maerena W. Brevard
(74) *Attorney, Agent, or Firm*—Morgan Lewis & Bockius LLP (57) ABSTRACT

A multi-purpose travel bag may be used as a shoulder bag, a child booster seat or a backpack. The travel bag has a strap that may be configured in three different ways to accommodate each of the uses for the travel bag. The travel bag has multiple mounting positions to provide the various configurations of the strap.

39 Claims, 8 Drawing Sheets

MULTI-PURPOSE TRAVEL BAG WITH A MULTI-PURPOSE STRAP

BACKGROUND OF THE INVENTION

Travel bags that are convertible between a variety of configurations are especially useful for supporting the needs of children. These bags are equipped with numerous storage compartments designed to contain diapers, food, toys, clothes and other personal items for the child, or even the parent.

These travel bags can be used not only for storing items, but also as a seat for an adult or as a booster seat for a child. U.S. Pat. No. 5,234,143 illustrates one such travel bag. This conventional travel bag has a shoulder strap for carrying the bag as a shoulder bag. Separate backpack straps are also provided for carrying this conventional bag in a backpack configuration. This conventional travel bag can be converted into either a child booster seat or an adult seat.

Conventional bags, however, lack the versatility to be used as a child booster seat that can be safely secured to a variety of support surfaces, and that can also be used as a shoulder bag or backpack.

SUMMARY OF THE INVENTION

In view of such limitations on the versatility of the conventional travel bags, a multi-purpose article holder according to the invention comprises a storage bag with a strap that can be detachably connected to the bag in any one of three mounting positions. By connecting the strap in one of the three positions, it is oriented in any one of three configurations. The strap is connected to the first mounting position in a first configuration, the second mounting position in a second configuration and both of the first and third mounting positions in a third configuration.

These three alternate configurations of the strap allow for the article holder to be used as a shoulder bag, a booster seat or a backpack. The strap is adjustable in length to accommodate this variety of uses.

In the preferred embodiment, the multi-purpose article holder according to the invention can be converted into a child booster seat having a cushioned seating surface and a foldable backrest. A rigid housing provides several storage compartments as well as the structural integrity to provide an elevated seating surface for a child. A panel is hinged to the housing so that it can be folded between a stowed position and an extended position. The panel forms the seatback when it is in the extended position.

A flexible cover envelops the housing and provides cushioned surfaces for the article holder when it is converted into a booster seat. This flexible cover has several storage pockets secured to the exterior surface as well as a flap that can be secured over the storage compartments.

DETAILED DESCRIPTION OF THE DRAWINGS

Figure 1:
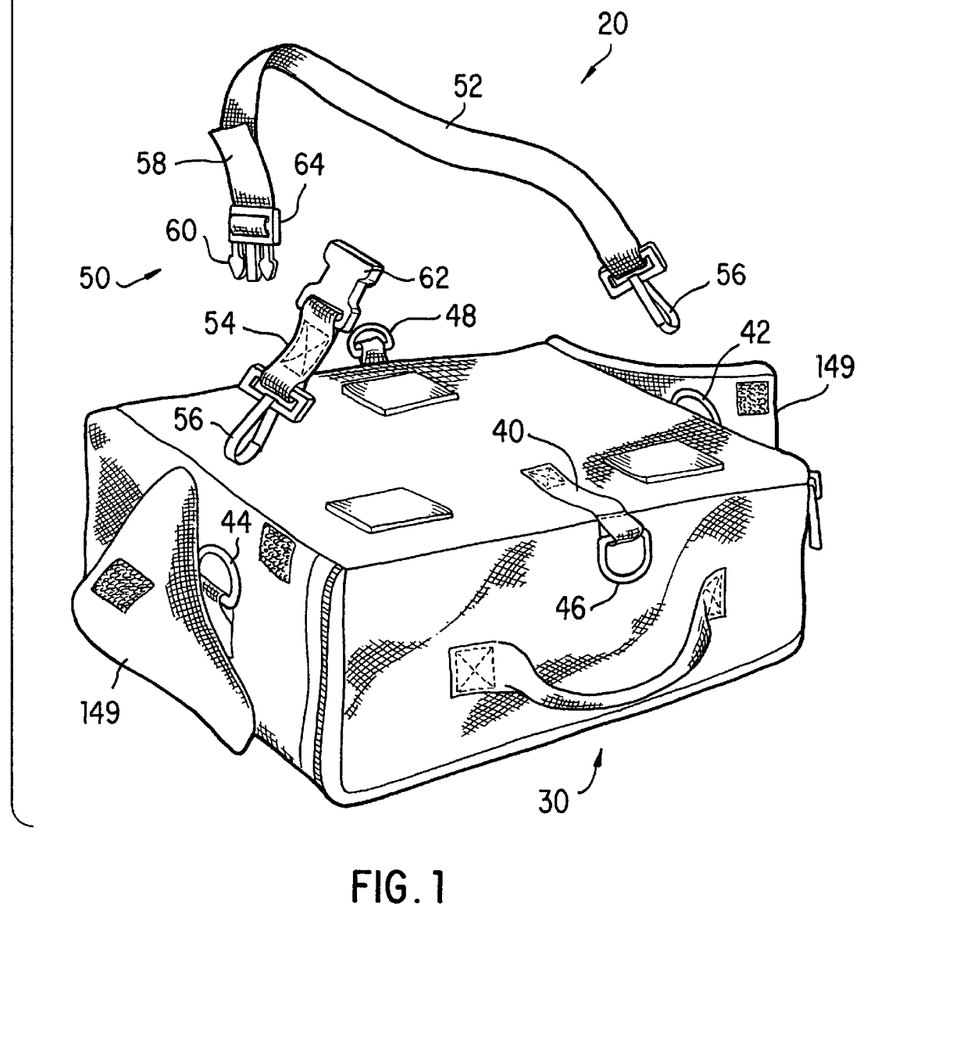
FIG. 1 is a perspective view of the multi-purpose article holder.

A multi-purpose article holder embodying the principles of the invention is illustrated in FIG. 1. The article holder can be used as a shoulder bag, a backpack and a booster seat. This article holder can be equipped with a variety of storage compartments to carry a variety of childcare and personal items. A single detachable strap can be reconfigured to facilitate the use of this article holder as a shoulder bag, a backpack or a child booster seat.

Providing multiple positions for attachment of the strap to the article holder further enhances the versatility of the article holder so that the strap can function as a tether for securing the article holder to a variety of support surfaces. The support surfaces to which the article holder can be secured include conventional single seat chairs and bench seats.

FIG. 1 shows a multi-purpose article holder in the form of a travel bag 20 that includes a storage bag 30, a loop 40, four mounting rings 42, 44, 46, 48 and a strap 50. First ring 42 is mounted on the storage bag 30 opposite second ring 44. Third ring 46 is mounted on the storage bag 30 opposite fourth ring 48. The loop 40 is mounted on the storage bag 30 proximate the third ring 46.

The strap 50 includes a first strap portion 52 and a second strap portion 54. A hook 56 is connected to one end of each of the strap portions 52, 54. The hooks 56 can be attached to either the first and second rings 42, 44 or the third and fourth rings 46, 48.

A connector is used to join the two strap portions 52, 54. This connector includes a tongue 60 mounted on the other end of first strap portion 52 and a buckle 62 mounted on the other end of the second strap portion 54. The tongue 60 can be disengaged from the buckle 62 to separate the first strap portion 52 from the second strap portion 54. This connector can be any conventionally known buckle and tongue connector. Alternatively, the connector can be in the form of a ring and a hook, a snap, a clasp or other similar device.

The length of the strap 50 can be adjusted by selectively passing the first strap portion 52 through an adjusting loop 64 in a conventional manner. Pulling the free end 58 of the first strap portion 52 away from the tongue 60 shortens the length of the strap 50. Pushing the free end 58 towards the adjusting loop 64 lengthens the strap 50.

Adjusting loop 64 can be of any conventional variety. Adjusting loop 64 is shown in the figures as being integral with the tongue 60. But it can be integrated with the buckle 62 or associated with the strap 50 independent of the connector 60. Adjusting loop 64 can also be associated with either the first strap portion 52 or the second strap portion 54.

The strap 50 is oriented in a first configuration when the hooks 56 are connected to the first and second rings 42, 44. In this first configuration, the strap 50 can be modified for use as a shoulder strap, a booster seat tether or a backpack strap.

Figure 2:
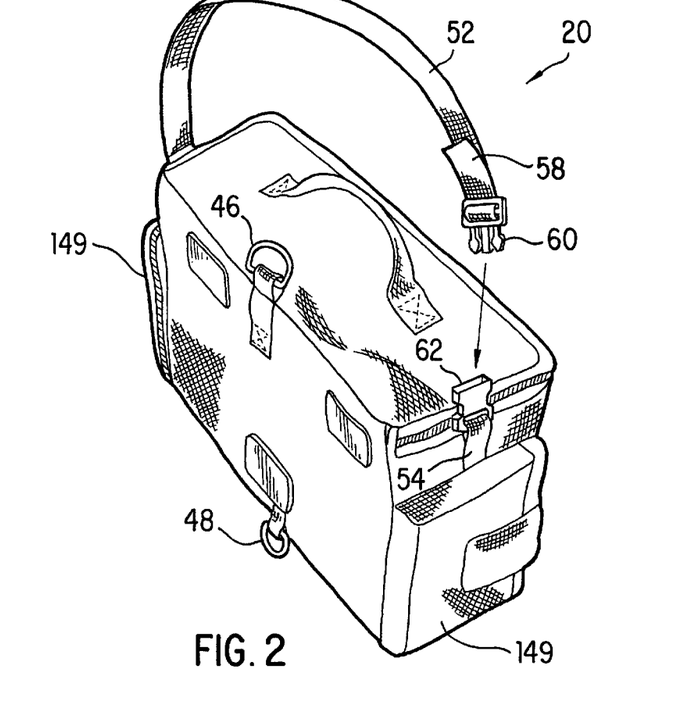
FIG. 2 is a perspective view of the article holder with the strap in a first configuration.

FIG. 2 shows the travel bag 20 in the first configuration with a shoulder strap. The rings 42, 44 and the hooks 56 are concealed behind side pockets 149 in FIG. 2. The strap 50 can be used as a shoulder strap after the tongue 60 is inserted into the buckle 62.

Figure 4:
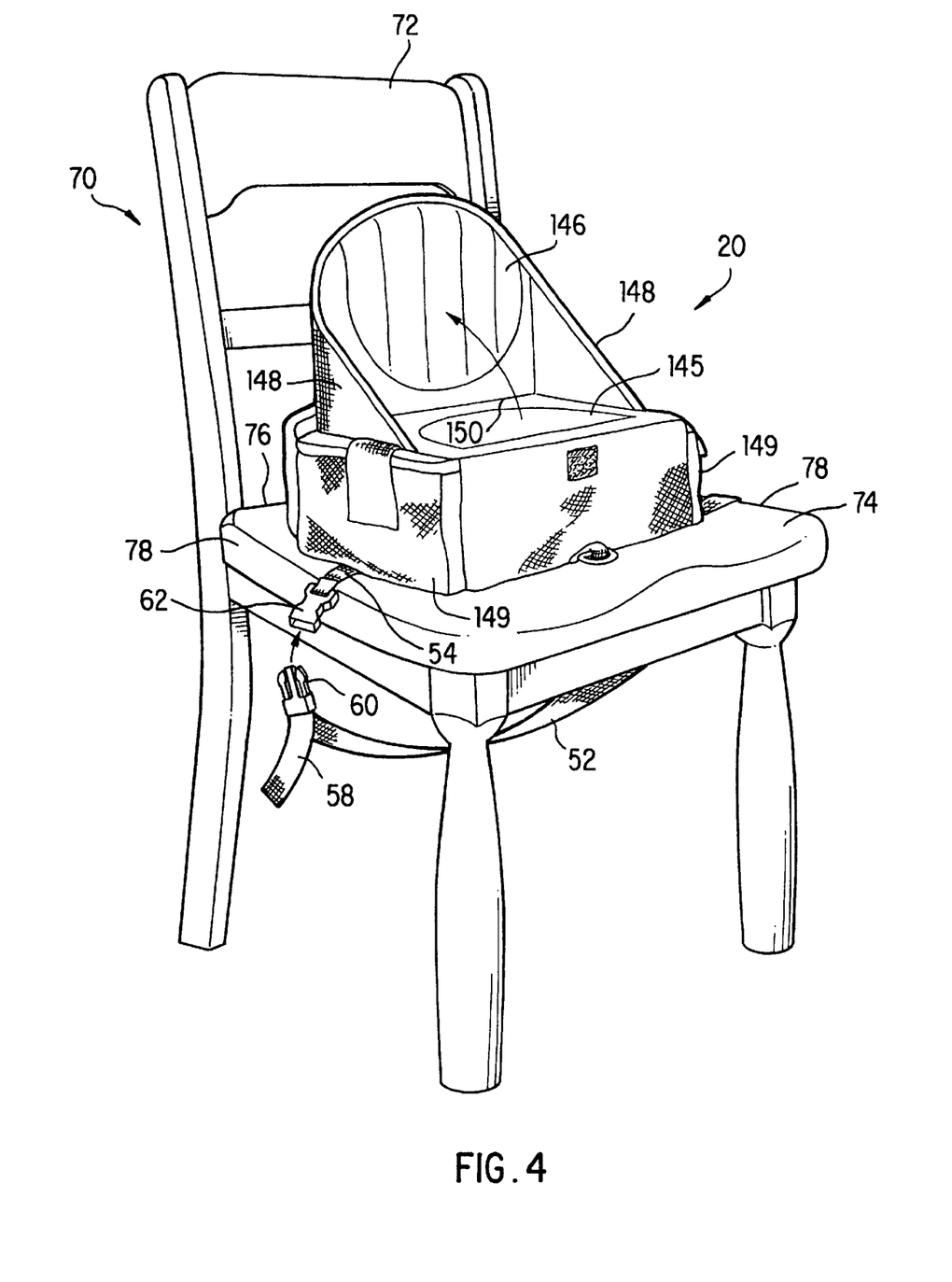
FIG. 4 is a perspective view of the article holder used as a booster seat and with the strap in a first configuration.

FIG. 4 illustrates the strap 50 in the first configuration and used as a booster seat tether. The connections between rings 42, 44 and the hooks 56 are concealed behind the side pockets 149 in FIG. 4. The travel bag 20 is placed on a single seat chair 70. The chair 70 has a seat back 72 and a seat bottom 74. The seat bottom has a back 76 and two lateral sides 78.

The travel bag 20 is secured to the chair 70 by first disengaging the buckle 62 and the tongue 60 to separate the first and second strap portions 52, 54. The travel bag 20 is properly aligned with the back 76 of the seat bottom 74 so that the strap 50 can be secured across the lateral sides 78 of the seat bottom. The first strap portion 52 is wrapped underneath the seat bottom 74 so that it extends from one lateral side 78 to the other lateral side 78. The tongue 60 is then inserted into the buckle 62. The free end 58 of the strap 50 is then pulled to tighten the strap 50 against the seat bottom 74.

Figure 5:
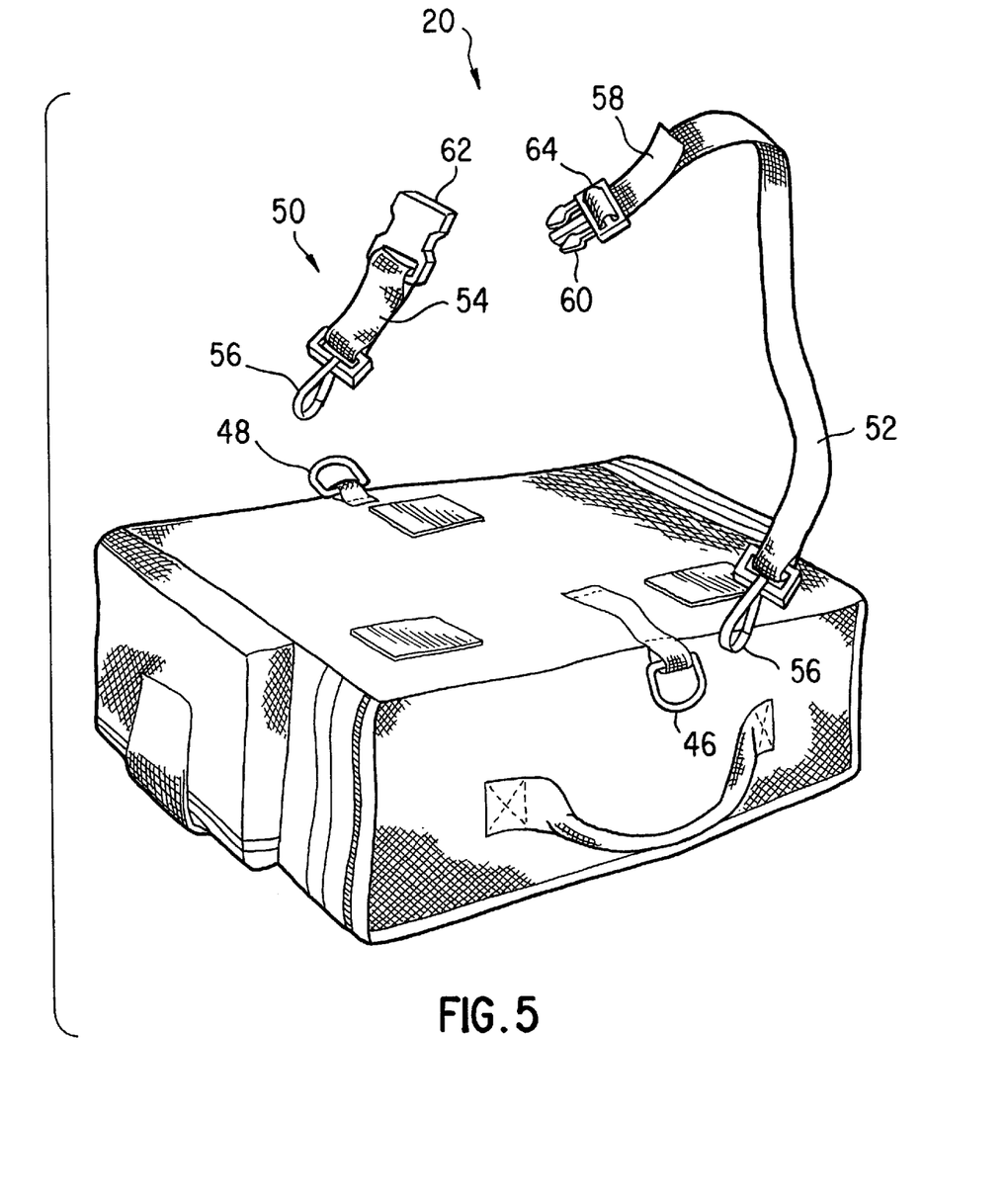
FIG. 5 is a perspective view of the article holder with the strap in a second configuration.
Figure 6:
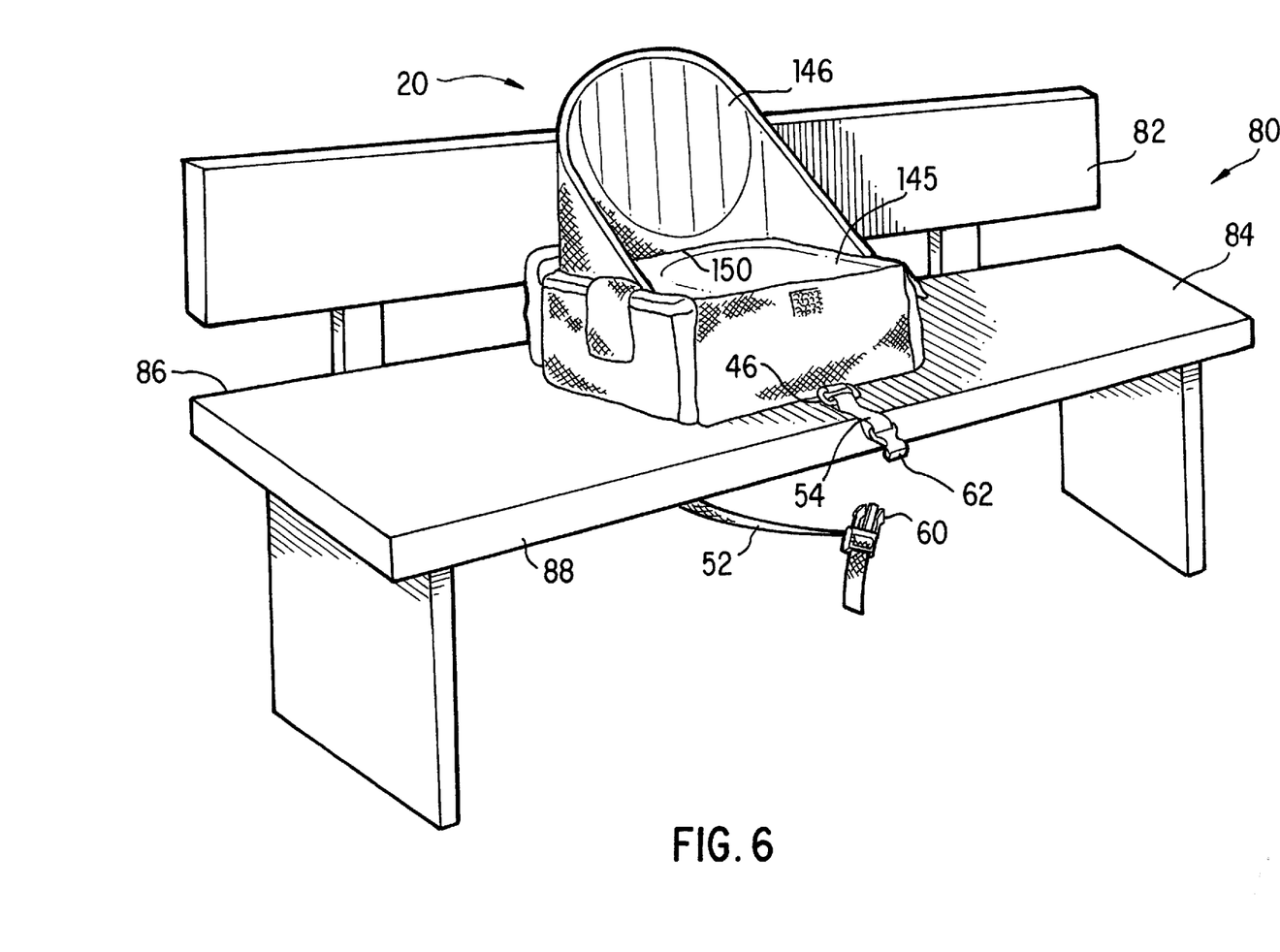
FIG. 6 is a perspective view of the article holder used as a booster seat and with the strap in a second configuration.

The strap 50 can be secured to the travel bag 20 in a second configuration, as depicted by FIGS. 5 and 6. The hooks 56 are connected to the third and fourth rings 46, 48, respectively.

The tongue 60 is disengaged from buckle 62 to separate the two strap portions 52, 54. The travel bag 20 is placed on a bench seat 80. The bench seat 80 has a seat back 82 and a seat bottom 84.

The travel bag 20 is secured to the bench 80 by first disengaging the buckle 62 and tongue 60 to separate the first and second strap portions 52, 54. The travel bag 20 is properly aligned with the back 86 of the seat bottom 84 so that the strap 50 can be secured under the seat bottom 84 from the back 86 to the front 88. The first strap portion 52 is wrapped underneath the seat bottom 84 so that it extends from the front 88 to the back 86. The tongue 60 is then inserted into the buckle 62. The free end of the strap 58 is then pulled to tighten the strap 50 against the seat bottom 84. Thus the travel bag 20 can be secured to a seat that has a variety of seat bottom configuration.

Figure 3:
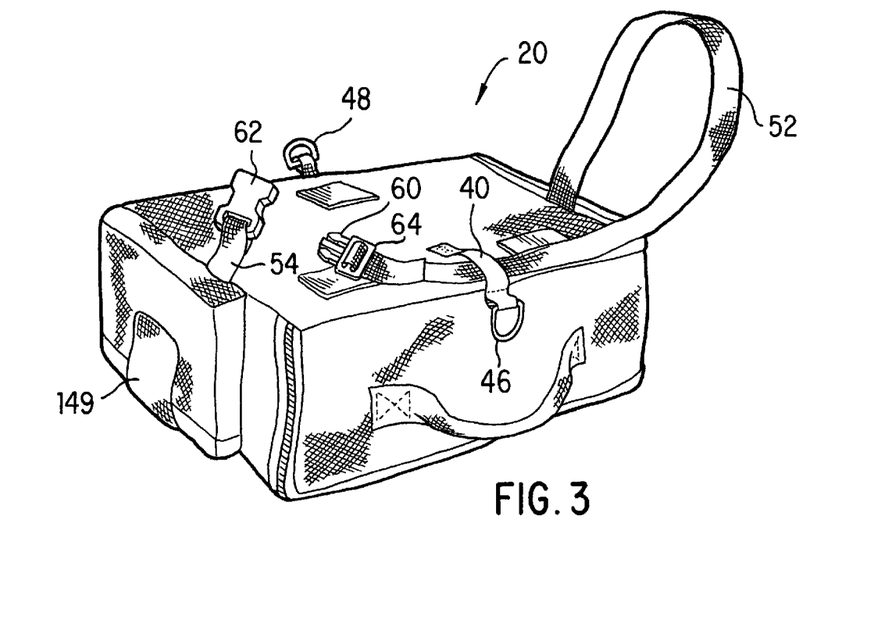
FIG. 3 is a perspective view of the article holder with the strap in a third configuration.

The third configuration of the strap 50 divides the strap 50 into two backpack straps. This configuration is represented by FIG. 3. The hooks 56 are again connected to the first and second rings 42, 44 as in the first configuration shown in FIGS. 2 and 4. Additionally, the strap 50 is secured to the travel bag 20 at a third mounting position via the loop 40. After the tongue 60 is disengaged from the buckle 62, the first strap portion 52 can be threaded through the loop 40. The tongue 60 can be inserted into the buckle 62 to re-connect the two strap portion 52, 54. The loop 40 engages a central portion of the strap 50 to divide the strap 50 into two backpack straps.

Thus, a single strap 50 can be used to carry the travel bag 20 as a shoulder bag or a backpack. This same strap 50 can also be used to tether the travel bag 20 to a variety of seats, such as, a single seat chair 70 or a bench 80. This mounting arrangement minimizes the number of straps 50 necessary for the travel bag 20 while providing for a plurality of convertible uses for the travel bag 20.

Figure 7:
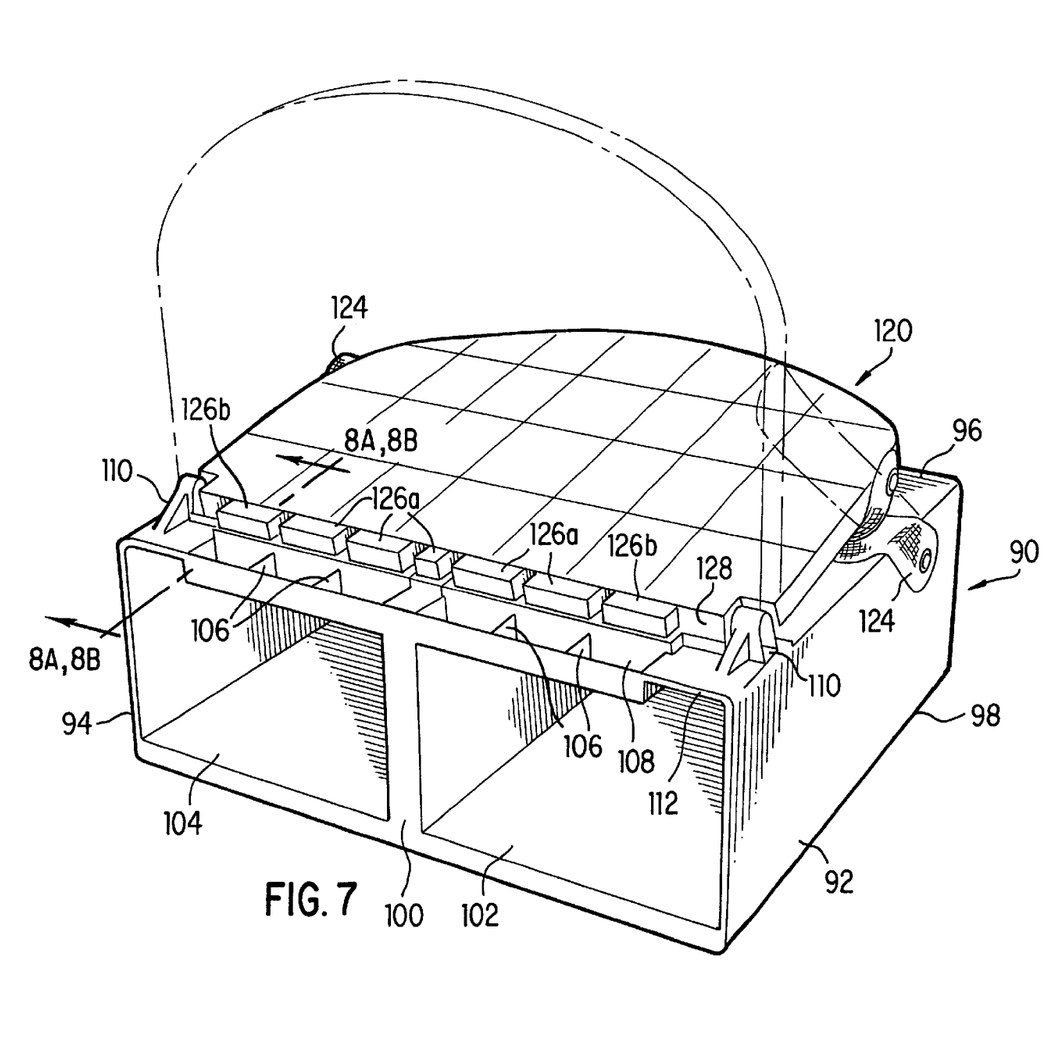
FIG. 7 is a perspective view of a rigid housing forming part of the article holder.
Figure 8A:
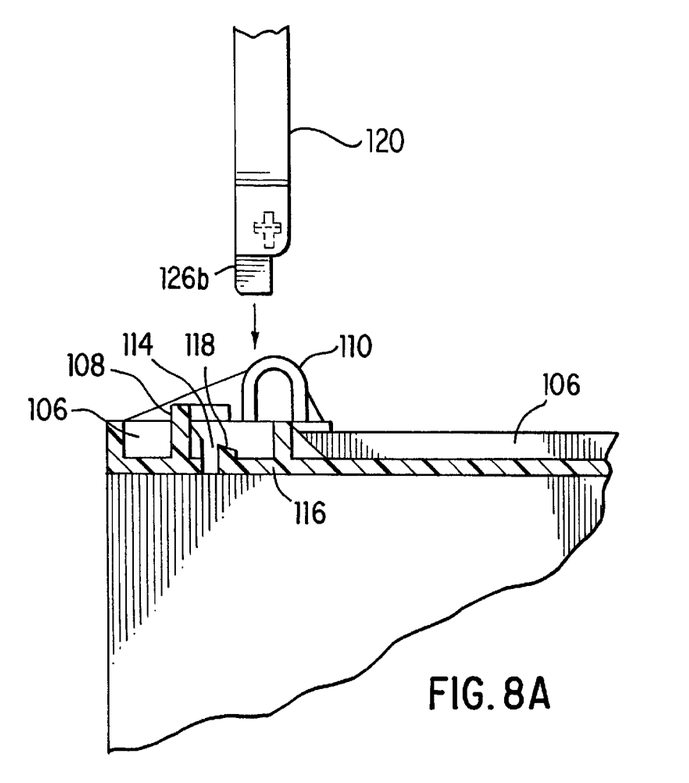
FIGS. 8A and 8B are partial views of the rigid housing taken in cross-section along lines 8—8 of FIG. 7
Figure 8B:
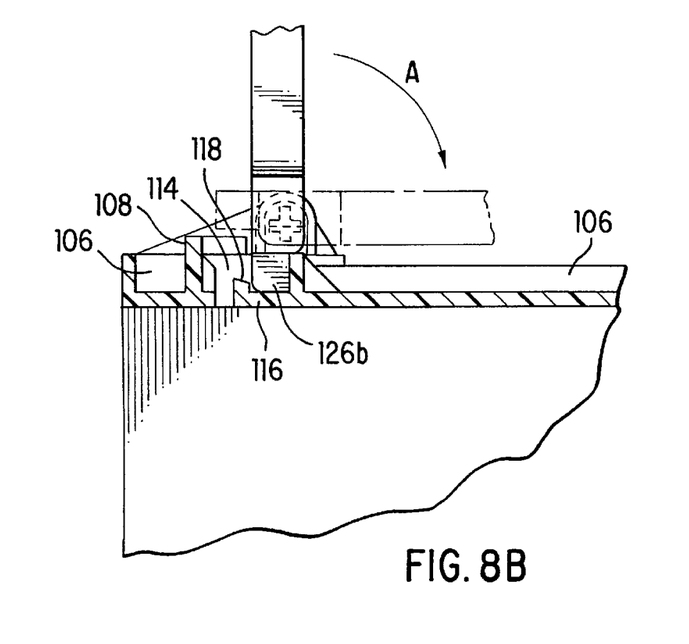
Figure 9:
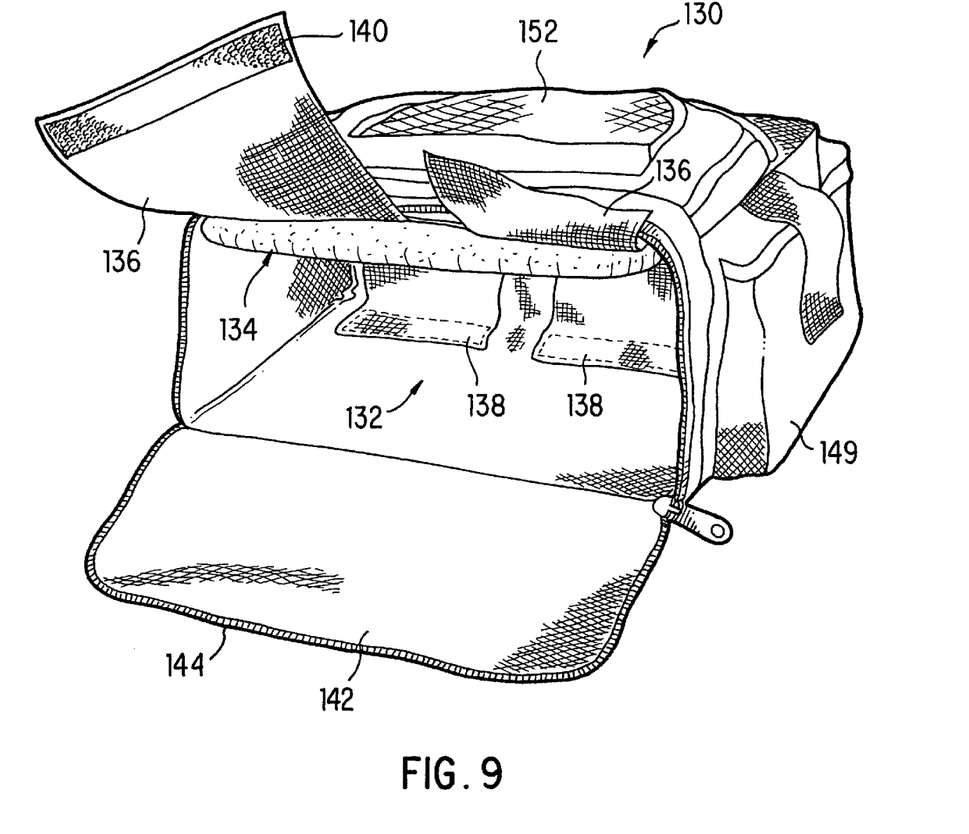
FIG. 9 is a perspective view of a flexible cover forming part of the article holder.

Referring to FIGS. 7–9, the travel bag 20 can include a storage bag 30 comprising a rigid housing 90 (FIGS. 7–8), a movable panel 120 (FIGS. 7–8) and a flexible cover 130 (FIG. 9). The rigid housing has two side faces 92, 94, a front face 96 and a rear face 98. The two side faces 92, 94, the front face 96 and the rear face 98 define a hollow passage in the housing 90. A divider 100 separates this hollow passage into two storage compartments 102, 104. Alternatively, the housing 90 can include any number of storage compartments, or even removable sections to vary the number and size of available storage compartments.

This rigid housing 90 includes a plurality of ribs 106 extending across the front face 96 between the two open ends of the housing 90 and parallel to the side faces 92. Referring to FIGS. 8–9, a plurality of transverse ribs 108 extend across the front face 96 between and perpendicular to the side faces 92, 94. These ribs 106, 108 provide structural integrity to the housing 90. Two hinges 110 are mounted toward the back edge 112 of the front face 96.

FIGS. 8A and 8B show details relating to the ribs 106, 108 with FIG. 8A showing the panel 120 in an unassembled state relative to the housing 90. The ribs 106, 108 define recesses. Two of these recesses 114 each have a bottom surface formed by a detent 116. Each detent 116 is cantilevered to the housing 90 and has a ramp 118 at its free end.

The rigid panel 120 has two hinge pins 122 received in the hinges 110 of the housing 90. This permits the panel 120 to be folded between an extended position and a stowed position as indicated by arrow A in FIG. 8B. FIG. 7 shows the panel 120 in the stowed position such that the panel 120 lies proximate the front face 96 of the housing 90, with the extended position being shown in phantom.

The panel 120 is moved into the extended position to provide a seat back when the travel bag 20 is converted into a booster seat as shown in FIGS. 4 and 6. A flexible strap 124 is mounted on either side of the panel 120 and secured to the side faces 92, 94 of the housing 90. These flexible straps 124 prevent the panel 120 from collapsing backward when a child leans against the panel 120 when it is in the extended position.

The panel 120 has a plurality of projections 126a, 126b extending from a bottom edge 128 of the panel 120. These projections 126a, 126b extend into the recesses 114 formed on the front face 96 of the housing 90 opposite the projections 126a. Two of these projections 126b are opposite recesses 114. These projections 126b extend into the two recesses 114 and engage the detent 116 when the panel 120 moves between the stored and extended positions. Each projection 126b engages a respective ramp 118 and deflects the associated detent 116 away from the front face 96. This allows each projection 126b to pass beyond the respective detent 116 as the panel 120 is moved between its two positions. The ramp 118 is biased into engagement with projection 126b due to the cantilever connection of the detent with the housing 90. This arrangement assists in maintaining the panel 90 in the extended position, as shown in FIG. 8B.

The projections 126a, 126b and the detents 116 illustrate one way in which the panel can be firmly held in or biased into the extended position. Latches, detents extending into holes, a ratchet and a pawl, a spring biased cam and follower or other similar designs can be used to provide this function.

The flexible cover 130 has two cavities 132, 134. Four flaps 136, 138 are mounted in first cavity 132. Flaps 136 oppose flaps 138. Each flap 136 has a hook and loop fastener 140 that mates with a respective hook and loop fastener (not shown) on each of the opposing flaps 138. Fasteners 140 can be snaps, hooks and rings, clasps, buckles or other similar fasteners.

The housing 90 can be inserted into first cavity 132 and the panel 120 can be inserted into second cavity 134. The flaps 136, 138 can then be extended through the two storage compartments 102, 104 and connected together by the mating fasteners 140. The fasteners 140, in turn, secure the housing 90 inside the flexible cover 130.

A flap 142 is extendible over the openings to both cavities 132, 134. A zipper 144 can be used to detachably secure a portion of the flap 140 to the cover 130. Articles, such as toys, bottles, and other personal items can be placed in each of the storage compartments 102, 104. The flap 142 can then be extended over the openings to the compartments 102, 104 and the zipper 144 closed to seal the articles in the storage compartments 102, 104.

Referring to FIGS. 4, 6 and 9, the cover 130 includes a cushioned seating surface 145 and a seat back surface 146. Side bolsters 148 extend parallel to the side faces 92, 94 of the housing. A common edge 150 joins the seating surface 145 to the seat back surface 146. Common edge 150 allows the second cavity 134 to move relative to the first cavity 132 as the panel 120 moves between the extended and storage positions.

The flexible cover 130 includes two side pockets 149 and a front pocket 152 secured to its exterior surface to provide additional storage.

It will be understood that the various modifications and changes can be made in the configurations of the strap, the positions of attachment to the article holder and the structure of the article holder. A variety of conventional materials can be selected to form the strap, the article holder and any covering. Further, the rigid housing can be replaced with a foam insert or other suitable design allowing the travel to be used as a child booster seat.

What is claimed is:

1. A multi-purpose article holder comprising:
   a storage bag;
   a first mounting position on said storage bag;
   a second mounting position on said storage bag;
   a third mounting position on said storage bag; and
   a strap connectable to said storage bag in a first configuration, a second configuration and a third configuration, said strap is connected to said first mounting position in said first configuration, said strap is connected to said second mounting position in said second configuration and said strap is connected to said first and third mounting positions in said third configuration;
   said first mounting position is defined by a first pair of opposed anchors;
   said second mounting position is defined by a second pair of opposed anchors located at a different orientation relative to said first pair of opposed anchors;
   said third mounting position is defined by a third anchor;
   said first and second pair of anchors are one of a hook and a ring and said strap including the other of a hook and a ring at each end thereof;
   said third anchor is a loop;
   said first pair of anchors are perpendicular to said second pair of anchors;
   said loop is located intermediate said first pair of anchors and proximate said second pair of anchors;
   said strap further comprises:
      a first strap portion and a second strap portion; and
      a disengageable connector connecting said first strap portion to said second strap portion; said connector comprises:
         a buckle on one of said first and second strap portions; and
         a tongue on the other of said first and second strap portions.

2. The multi-purpose article holder of claim 1 wherein said connector comprises a length adjustment loop integral with one of said buckle and said tongue.

3. A multi-purpose article holder comprising:
   a storage bag;
   a first mounting position on said storage bag;
   a second mounting position on said storage bag;
   a third mounting position on said storage bag; and
   a strap connectable to said storage bag in a first configuration, a second configuration and a third configuration, said strap is connected to said first mounting position in said first configuration, said strap is connected to said second mounting position in said second configuration and said strap is connected to said first and third mounting positions in said third configuration;
   said storage bag comprises:
      a rigid housing comprising at least one storage compartment and providing an elevated seating surface;
      a rigid panel movably connected to said rigid housing; and
      a flexible cover comprising at least one cavity, said housing is received in said cavity.

4. The multi-purpose article holder of claim 3 further comprising a fastener connecting said housing to said cover.

5. A multi-purpose article holder comprising:
   a storage bag;
   a first mounting position on said storage bag;
   a second mounting position on said storage bag;
   a third mounting position on said storage bag; and
   a strap connectable to said storage bag in a first configuration, a second configuration and a third configuration, said strap is connected to said first mounting position in said first configuration, said strap is connected to said second mounting position in said second configuration and said strap is connected to said first and third mounting positions in said third configuration;
   said storage bag comprises:
      a rigid housing comprising at least one storage compartment;
      a rigid panel movably connected to said rigid housing; and
      a flexible cover comprising at least one cavity, said housing is received in said cavity;
      said flexible cover comprising at least two cavities, said housing received in one of said cavities and said panel received in another one of said cavities.

6. The multi-purpose article holder of claim 5 wherein said rigid housing comprises two opened ends, first and second side walls, and front and back walls connecting said side walls, said walls extending between said openings; and
   said cover comprises a cushioned seating surface adjacent said front wall, a seat back surface adjacent said panel, said seat back surface and said seating surface having a common edge, and a flap extending over said cavity.

7. The multi-purpose article holder of claim 6 wherein said first mounting position is defined by first and second rings mounted on said cover adjacent said first and second side walls, respectively;
   said second mounting position is defined by a third ring mounted on said cover adjacent the edge bordering said back wall and one of said openings and a fourth ring mounted on said cover adjacent the edge bordering said back wall and the other of said openings; and said third mounting position is defined by a loop mounted on said cover adjacent said back wall and adjacent said fourth ring.

8. The multi-purpose article holder of claim 7 further comprising at least one storage pocket secured to the exterior of said cover.

9. A multi-purpose article holder comprising:
   a storage bag;
   a first mounting position on said storage bag;
   a second mounting position on said storage bag;
   a third mounting position on said storage bag; and
   a strap connectable to said storage bag in a first configuration, a second configuration and a third configuration, said strap is connected to said first mounting position in said first configuration, said strap is connected to said second mounting position in said second configuration and said strap is connected to said first and third mounting positions in said third configuration;
   said storage bag comprises:
      a rigid housing comprising at least one storage compartment; and
      a rigid panel movably connected to said storage bag;
      one of said panel and said rigid housing comprising at least one projection extending toward the other of said panel and said rigid housing;
      the other of said panel and said rigid housing comprising a recess opposite said at least one projection, said projection extending towards the surface in which said recess is formed in a interference fit when said panel is moved between a first position wherein said panel lying proximate to said rigid housing and a second position wherein said panel extending away from said rigid housing; and further comprising a hinge movably connecting said panel to said rigid housing.

10. The multi-purpose article holder of claim 9 further comprising a detent defining the bottom surface of said recess, said projection engageable with said detent when said panel is moved between said first and second positions.

11. The multi-purpose article holder of claim 10 wherein said detent is a cantilever ramp.

12. A child booster seat comprising:
   a seating surface;
   a rear surface opposite said seating surface;
   at least one intermediate surface connecting said seating surface to said rear surface;
   a first mounting position on said intermediate surface;
   a second mounting position on said rear surface; and
   a tether connectable in a first configuration and a second configuration, said tether is connected to said first mounting position in said first configuration and said tether is connected to said second mounting position in said second configuration.

13. The child booster seat of claim 12 wherein said first mounting position is defined by a first
   pair of opposed anchors; and
   a second mounting position is defined by a second pair of opposed anchors perpendicular to said first pair of opposed anchors.

14. The child booster seat of 13 further comprising:
   a panel movably connected to said seat bottom, said panel having a seat back surface.

15. The child booster seat of claim 14 further comprising at least one compartment between said
   seat bottom and said rear surface.

16. The child booster seat of claim 12, wherein said tether is adapted for securing said booster seat to an adult seating surface when in said second configuration.

17. The child booster seat of claim 12, wherein said tether is configurable as a backpack strap in said first configuration.

18. The child booster seat of claim 12, wherein said tether is configurable as a shoulder strap in said second configuration.

19. A child booster seat and article holder comprising: a storage bag having a seat bottom and a rear surface opposite said seat bottom;
   a first mounting position on said storage bag;
   a second mounting position on said rear surface;
   a third mounting position on said storage bag; and
   a strap connectable to said storage bag in a first configuration, a second configuration and a third configuration, said strap is connected to said first mounting position in said first configuration, said strap is connected to said second mounting position in said second configuration and said strap is connected to said first and third mounting positions in said third configuration.

20. The child booster seat and article holder of claim 19 wherein said strap is a carrying strap when said strap is in at least one of said configurations and said strap is a booster seat tether when said strap is in another one of said configurations.

21. A child booster seat securable to an adult seat having an adult seating surface, comprising:
   a flexible cover including a seating surface, a lower surface opposite the seating surface and a cavity formed between the seating surface and lower surface;
   a support received in the cavity, the support providing an elevated seating area for a child placed on the seating surface;
   a seatback adjacent to the seating surface and movable between a folded and upright position;
   a first mounting position disposed on the lower surface; and
   a strap having first and second ends, the strap being connectable to and removable from the flexible cover and the first and second ends being connectable to each other and configurable as a booster seat tether and at least one of a backpack strap and shoulder strap;
   wherein when the strap is configured as the booster seat tether, the strap is connected to the first mounting position and the ends are connected beneath the adult seating surface so as to secure the booster seat to the adult seat.

22. The child booster seat according to claim 21, wherein the first mounting position includes two spaced connectors secured to the lower surface.

23. The child booster seat according to claim 22, wherein each of the connectors form a respective aperture for releasably connecting the strap to the flexible cover.

24. The child booster seat according to claim 23, wherein the strap further includes third and fourth ends adapted for releasable engagement with the respective apertures.

25. The child booster seat according to claim 24, said flexible cover further including a releasable flap having a first portion that is releasably connectable to one of the seating surface and lower surface and a second portion that is pivotal about the other of the seating surface and lower surface so as to provide access to the support received within the cavity; and a carrying handle disposed on the releasable flap.

26. The child booster seat according to claim 21, wherein the strap further comprises a first strap portion and a second strap portion separable from the first strap portion.

27. The child booster seat according to claim 26, wherein the first strap portion includes a third end and the first end and the second strap portion includes a fourth end and the second end;

wherein the third end and the fourth end are connectable to and removable from the flexible cover.

28. The child booster seat according to claim 21, wherein the support comprises a foam insert.

29. The child booster seat according to claim 21, wherein the support comprises a rigid housing.

30. The child booster seat according to claim 21, wherein the flexible cover further includes a side support extending between and connected to each of the seat back and seat bottom so as to support the seat back in a substantially upright position when the child is placed in the booster seat.

31. A child booster seat configured to be securable to at least one a plurality of different types of adult seat surfaces, the child booster seat comprising:

a flexible cover including a seating surface, a lower surface opposite the seating surface and a cavity formed between the seating surface and lower surface;

a first mounting position disposed on the lower surface;

a support received in the cavity, the support providing an elevated seating area for a child placed on the seating surface; and a strap assembly having at least a first configuration and a second configuration, wherein a portion of the strap assembly is connected to the first mounting position and the child booster seat is securable to a first type of adult seat surface in the first strap assembly configuration and wherein the child booster seat is securable to a second type of adult seat surface, different from the first type of adult seat surface, in the second strap assembly configuration.

32. The child booster seat according to claim 31, wherein the first mounting position includes two spaced connectors secured to the lower surface.

33. The child booster seat according to claim 31, wherein the strap assembly portion is secured to a second mounting position in the second strap assembly configuration.

34. The child booster seat according to claim 33, wherein the second mounting position is disposed adjacent to the lower surface.

35. The child booster seat according to claim 31, wherein the strap assembly portion includes a first and second strap portion connectable to the first mounting position.

36. The child booster seat according to claim 31, wherein the entirety of the strap assembly is removable from the flexible cover.

37. The child booster seat according to claim 31, wherein the support is a foam insert.

38. The child booster seat according to claim 31, wherein the second type of adult seat surface is a horizontal seat surface.

39. The child booster seat according to claim 31, wherein the flexible cover further includes a side support extending between and connected to each of the seat back and seat bottom so as to support the seat back in a substantially upright position when a child is placed in the booster seat.

* * * * *